United States Patent [19]

Lang

[11] Patent Number: 4,724,593
[45] Date of Patent: Feb. 16, 1988

[54] METHOD AND BLANK FOR THE MANUFACTURE OF HIGH EFFICIENCY OPEN VOLUMED PACKING BODIES

[76] Inventor: Ko C. Lang, 3072 E. Sierra Dr., Westlake Village, Calif. 91362

[21] Appl. No.: 902,865

[22] Filed: Sep. 2, 1986

[51] Int. Cl.⁴ .................... B01F 3/04; B21D 53/00; B29C 53/02

[52] U.S. Cl. ................... 29/163.5 R; 29/163.5 F; 29/445; 72/379; 264/339; 261/94; 261/DIG. 72; 428/577

[58] Field of Search .................. 261/94, DIG. 72; 264/154, 156, 339, 295; 72/379; 428/577, 582, 583, 596, 603, 597; 29/163.5 R, 163.5 F, 445

[56] References Cited

U.S. PATENT DOCUMENTS

| | | | |
|---|---|---|---|
| Re. 27,217 | 11/1971 | Eckert | 261/DIG. 72 |
| 1,480,463 | 1/1924 | Petzel | 261/DIG. 72 |
| 2,921,776 | 1/1960 | Keeping | 261/DIG. 72 |
| 4,366,608 | 1/1983 | Nagaoka | 261/94 |
| 4,496,498 | 1/1985 | Ploss | 261/DIG. 72 |
| 4,600,544 | 7/1986 | Mix | 261/94 |

FOREIGN PATENT DOCUMENTS

| | | | |
|---|---|---|---|
| 853159 | 8/1952 | Fed. Rep. of Germany | 261/94 |
| 1945048 | 3/1971 | Fed. Rep. of Germany | 261/94 |
| 3244921 | 6/1984 | Fed. Rep. of Germany | 261/DIG. 72 |
| 374707 | 6/1932 | United Kingdom | 261/94 |

Primary Examiner—John J. Zimmerman
Attorney, Agent, or Firm—Poms, Smith, Lande & Rose

[57] ABSTRACT

A method and manufacturing blank for the production of high performance substantially symmetrical open volumed packing bodies is disclosed comprising the steps of forming a blank from sheet material, the blank comprising a plurality of generally identical plates interconnected in linear series by ribbon members coupling adjacent plates and defining a median strip, shaping the plates into troughs having longitudinal axes oriented perpendicularly to the median strip, and bending the median strip to bring the longitudinal axes into close proximity with one another to form an open volumed packing body having a central core defined by the aligned bores.

17 Claims, 10 Drawing Figures

METHOD AND BLANK FOR THE MANUFACTURE OF HIGH EFFICIENCY OPEN VOLUMED PACKING BODIES

FIELD OF THE INVENTION

The present invention relates, in a broad aspect, to a method for manufacturing packing bodies for use in packed column or tower chemical processing operations. More particularly, the present invention is directed to a method and manufacturing blank for the production of high efficiency, high performance, substantially symmetrical, open volumed packing bodies.

BACKGROUND OF THE INVENTION

Packing bodies for use in chemical processing operations such as absorption, desorption, extraction, scrubbing, heat exchange and the like are well-known in the art. Typically, relatively large numbers of substantially identical packing bodies are loaded into processing columns or towers in a random or dumped manner. It is also known in the art to fill processing columns with structured packing materials comprising ordered arrays of substantially identical packing bodies. In both applications, the function of the packing bodies is to enhance fluid contact and interaction between opposing streams of fluid within the packed column or tower to enhance the efficiency and rate of the chemical process involved. The packing bodies accomplish this by providing large areas of wettable surface and by disrupting fluid flow within the column to form large numbers of individual droplets and fine streams thereby promoting the mixing of the various reaction streams.

Recently, high efficiency, high performance packing bodies have been developed which provide a substantially uniform distribution of open cellular units throughout their internal volume and external surface area. These high efficiency packing bodies provide maximal wettable surface area with a minimal restriction to fluid flow and are relatively insensitive to orientation within packed columns. As a result, the packing bodies can be dump loaded into processing columns or towers without fear of obstructing fluid flow and larger volumes of fluid can be passed through physically smaller columns at increased rates, thereby substantially increasing process efficiency and reducing costs.

Unfortunately, the uniform geometric configuration of these improved, high efficiency packing bodies makes it difficult if not impossible to produce such packing bodies in an economical manner. Prior art manufacturing techniques include casting, injection molding, and extrusion processes. All of these techniques have the drawback of eliminating a certain degree of the uniform radial symmetry within the ideal packing bodies in order to allow the packing body to be extruded from a die or released from a mold. While it is possible to cast complex structures such as these utilizing a lost wax or similar technique, this is a prohibitively expensive and time consuming process. Exotic multi-piece injection molds also can be utilized to produce substantially uniform packing bodies. However, these too are prohibitively expensive.

Even more significantly, a number of high temperature or chemically active processing systems require the utilization of metal packing bodies within the processing column or tower. To date, it has not been possible to produce a high efficiency, high performance, generally symmetrical, open volumed packing body from metal. Most prior art metal packing bodies have been formed from rolled metal blanks which have been punched or stamped prior to rolling. The rolled packing bodies are generally spherical or tubular in shape and may include internal projections to enhance their efficiency. However, their performance falls far short of that of ideal high efficiency packing bodies.

Accordingly, it is a principal object of the present invention to provide a method and associated blank for manufacturing high efficiency, high performance, substantially uniform and symmetrical, open volumed packing bodies from a wide variety of materials including metals, plastics and ceramics.

It is a further object of the present invention to provide a method and blank for manufacturing high efficiency, substantially uniform and symmetrical, open volumed packing bodies utilizing inexpensive mass production techniques that do not directly involve expensive casting, molding, or extrusion processes.

SUMMARY OF THE INVENTION

These and other objectives are achieved by the present invention which provides a method for manufacturing high performance, symmetrical, open volumed packing bodies having uniform geometrical configurations from a wide variety of materials. The method of the present invention is suitable for manufacturing open volumed objects having a wide variety of shapes and geometries including highly complex and efficient packing body configurations utilizing simple and economical sheet materials and manufacturing techniques.

In accordance with the present invention, substantially symmetrical open volumed column packing bodies are produced from a blank of sheet material. This generally planar blank of sheet material is formed as a plurality of generally identical plates which are interconnected in a linear series by one or more ribbon members coupling adjacent plates. This linear series of interconnected plates can be formed by cutting or stamping the desired sections from a single piece of sheet material or individual plates can be threaded together in series by one or more ribbon members coupling the generally outer periphery of adjacent plates. Either configuration is preferred and in both configurations the ribbon member defines a median strip linking the plates in a linear series.

During or after formation of the blank, each plate is shaped into a trough having its longitudinal axis oriented perpendicularly to the median strip. Shaping takes place through stamping, folding, or bending each plate in the same direction along each plate's longitudinal axis such that all longitudinal axes so formed are generally co-planar and parallel.

The shaped troughs can be arcuate or angular in cross section or combinations of both configurations. Angular troughs are contemplated as being either acute or obtuse depending upon the number of plates in the blank and the ultimate configuration of the packing body being produced. Additionally, the surface of each plate can be provided with projecting fingers or arches as well as crenellations and additional folds to increase the wettable surface area and number of drip formation points. Preferably, for ease of manufacturing, such additional surface features will be arranged generally parallel with the longitudinal axis of each plate though other arrangements are contemplated as being within the scope of the present invention.

Following the formation of the blank of substantially identical trough shaped plates interconnected by the ribbon member median strip, the ribbon members of the median strip are bent to bring the longitudinal axes of the trough shaped plates into close proximity with one another in substantially parallel alignment. The resulting configuration defines a packing body having an open internal configuration with a central, longitudinal core defined by the aligned axes of the plates and an outer, generally equatorial segmented median strip defined by the bent ribbon members. The general outer configuration of the packing body is defined by the initial shape of the plates. For example, circular plates will produce a spherical packing body whereas polygonal plates will produce a polyhedral packing body.

Those skilled in the art will appreciate that any number of plates may be linked in series to produce packing bodies having varying densities. Similarly, an almost infinite variety of packing body shapes can be construted utilizing the method of the present invention by designing the appropriate shaped plates in the initial starting blank.

It is also contemplated as being within the scope of the present invention to form the starting blank as a linear series of interconnected trough shaped plates rather than forming and shaping the blank in two separate operations. This method is suitable for both integral, one-piece blanks or multi-piece blanks stitched together with a flat ribbon member or members. However, where it is contemplated that the plates will incorporate projecting fingers or arcuate members, separate forming and shaping steps may be preferred.

The manufacturing blank can be formed of any suitable material or combination of materials including metals and plastics. For example, a one-piece linear series of plates can be stamped from sheet metal stock or plastic. Similarly, individual metal plates may be interconnected in series by one or more flat metal ribbon members. Alternatively, individual metal plates may be linked by a plastic ribbon member or vice versa.

In a preferred exemplary embodiment of the present invention each plate of the manufacturing blank is provided with a plurality of uniformly distributed open cellular units defined by concentric arcuate members interconnected by radially extending struts. Alternatively, each plate may be formed of open mesh materials such as metal screen. It is also contemplated as being within the scope of the present invention for each plate to be solid and non-perforated.

A further understanding of the present invention will be provided to those skilled in the art from the following detailed description and the associated drawings which first will be described briefly.

DETAILED DESCRIPTION

Figure 1:
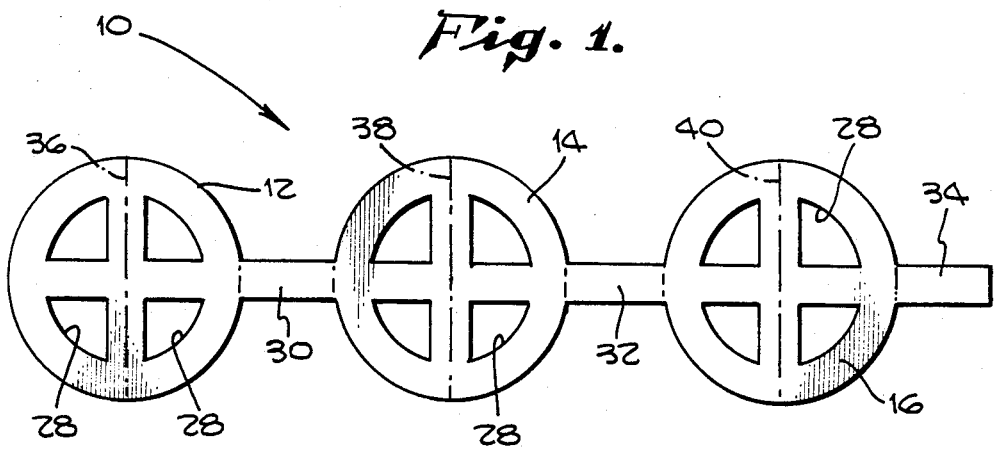
FIG. 1 is a plan view of an exemplary manufacturing blank illustrating the teachings of the present invention.

Referring more particularly to the drawings, FIGS. 1 through 4 illustrate an exemplary embodiment of a manufacturing blank and high performance, substantially symmetrical open volume packing body formed in accordance with the teachings of the present invention. Blank 10, comprises a plurality of generally identical plates 12, 14, and 16 which are interconnected in a linear series by ribbon members 30 and 32. Blank 10 is formed from sheet material using any known sheet manufacturing process including stamping, punching, and cutting operations. These manufacturing techniques of blank 10 are preferred however, in those situations where the material forming the blank 10 is not adaptable to such manufacturing techniques it is also contemplated as being within the scope of the present invention to cast blank 10 in sheet form. For example, while it is preferred that blank 10 is formed from metal or plastic, some chemical processing applications may require unique ceramic materials or reinforced plastics which are not readily suitable to punching or stamping operations.

It should be noted that while blanks 12, 14, and 16 are each shown provided with a plurality of holes 28, holes are not essential to the present invention. Similarly, it is not essential to the present invention to have all plates of blank 10 exactly identical. Accordingly, some plates may be provided with holes 28 and others may be solid. Similarly, varying numbers of holes may be provided in different plates or some plates may be sized or shaped slightly different from the other plates in the blank. However, the generally identical plates 12, 14, and 16 of blank 10 are preferred as this both simplifies manufacturing and provides a desired degree of symmetry to the open volumed packing body formed in accordance with the present invention.

Ribbon members 30 and 32 couple adjacent plates in a linear series to form blank 10 and define a median strip linking the linear series of the plates. An additional ribbon ribbon member 34 may be provided as shown on plate 16 in FIGS. 1 and 2, if desired. Similarly, an additional member (not shown) corresponding to ribbon member 34 may be provided on plate 12. These additional ribbon members are not essential to the practice of the present invention, but are desireable as they complete the median strip ultimately formed in the open volumed packing body.

Figure 2:
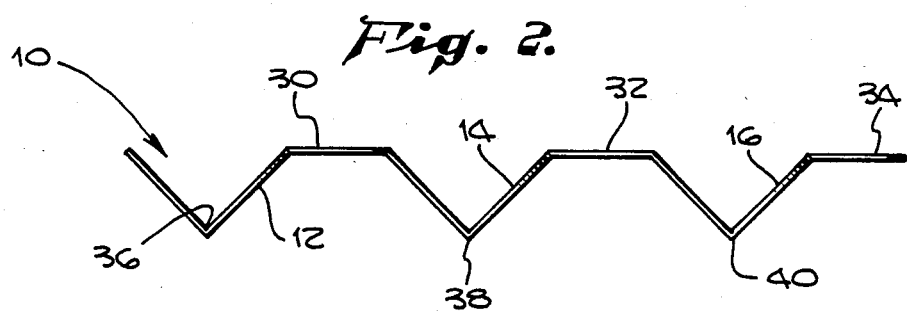
FIG. 2 is a side view of the manufacturing blank of FIG. 1.

Referring to FIG. 2, blank 10 is shown in side view to illustrate the trough shapes formed in plates 12, 14, and 16 with their respective longitudinal axes 36, 38 and 40 aligned generally perpendicularly to the median strip defined by ribbon members 30, 32, and 34. This shaping of plates 12, 14, and 16 can be accomplished during the original formation process through bending or folding blank 10 or by shaping the plates after formation of the blank. For example, in the first instance where blank 10 is stamped from sheet stock, it is possible to produce blank 10 with the appropriate trough shaped plates 12, 14, and 16. Either method is preferred. In FIG. 2, the troughs of plates 12, 14, and 16 are shown as being angular in cross section. It is also contemplated as being within the scope of the present invention to form arcuate or curved troughs as well as combinations of both configurations. For example, as long as the longitudinal axes 36, 38 and 40 are preserved, it is possible to add additional folds or crenellations to the surfaces of each plate to enhance both strength, rigidity and surface area.

Figure 3:
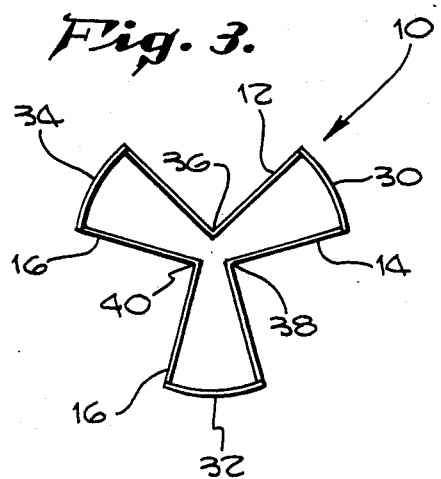
FIG. 3 illustrates a completed packing body formed from the blank of FIGS. 1 and 2 as viewed from one pole.
Figure 4:
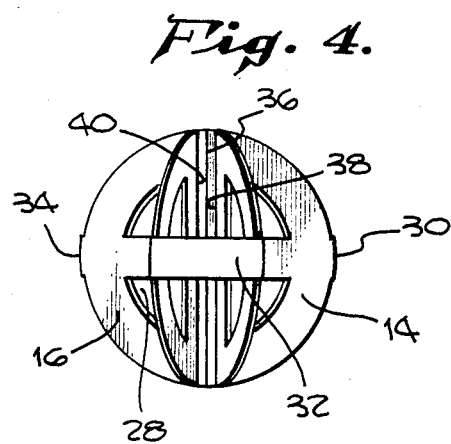
FIG. 4 is a side view of the packing body illustrated in FIG. 3.
Figure 5:
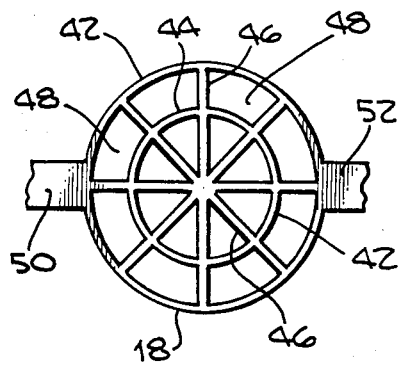
FIG. 5 is a plan view of a portion of a blank illustrating an alternative plate configuration.

To manufacture the high efficiency packing body, the method of the present invention takes the formed and shaped blank 10 and bends the ribbon members 30, 32, and 34 of the median strip to bring longitudinal axes 36, 38 and 40 into close proximity with one another in substantially parallel alignment as shown in FIGS. 3 and 4. Though ribbon members 30, 32, and 34 are shown in FIGS. 3 and 4 as bent in an arcuate fashion, this is not essential to practice the present invention. Those skilled in the art will appreciate that as long as the ribbon members are dimensioned appropriately to allow sufficient material for spanning the distance between plates 12, 14, and 16 in the ultimate folded or bent configuration, it is possible to bend ribbon members 30, 32, and 34 in a wide variety of configurations. Such configurations would include angles or multiple angles and crenellations as well as straight sections. These configurations are not shown in FIGS. 3 and 4.

Accordingly, by forming blank 10 with its plurality of plates 12, 14, and 16 interconnected by ribbon members 30, 32, and 34 and shaping plates 12, 14, and 16 into troughs with axes 36, 38 and 40 it is possible to bend the median strip defined by ribbon members 30, 32, and 34 to produce a substantially symmetrical open volumed packing body as shown in FIG. 4. The packing body has an outer configuration defined by the shape of plates 12, 14, and 16 and an inner core defined by their respective axes 36, 38, and 40. Holes 28 are uniformly distributed throughout the interior volume of the packing body formed by blank 10 making the packing body relatively insensitive to fluid flow orientation within a packed column.

The number of plates forming the blank of the present invention can be altered to suit the degree of packing body density desired. For example, two identical plates can be utilized to form a packing body having minimal internal density. Conversely, a virtually unlimited number of plates may be incorporated into the blank to form packing bodies having significantly higher densities. Thus, by varying the number of plates and the number of holes within each plate, it is possible to make extremely high efficiency, high performance packing bodies having complex geometries that are virtually impossible to make using known prior art techniques. Moreover, the method of the present invention makes it possible to construct such complex structures from metal and other materials without compromising the symmetry of the final packing body. Thus, the present invention makes it possible to construct high efficiency metal packing bodies in an inexpensive manner using conventional sheet material manufacturing techniques such as stamping, punching, and bending. Further economy in construction is achieved by utilizing a single manufacturing blank that does not require fasteners to maintain its ultimate shape. As a result, the method of the present invention is particularly well suited to automated production techniques having a minimal number of steps.

The ultimate external configuration of the packing body formed in accordance with the teachings of the present invention is detemined by the original shape of the plates forming the manufacturing blank. FIGS. 5 through 10 are illustrative of exemplary alternative embodiments of the present invention illustrating this variable feature. For example, in FIG. 5 plate 18 is formed with a plurality of concentric arcuate members 42 and 44 interconnected by a plurality of radially extending struts 46 defining a plurality of uniformly distributed open cellular units 48. Ribbon members 50 and 52 are shown extending from plate 18 in partial section to define the median strip linking adjacent plates (not shown) in linear series. This preferred exemplary plate configuration provides an extremely high degree of internal symmetry making the packing body particularly insensitive to fluid flow orientation within a packed column or tower. Moreover, the open cellular construction provides a maximal amount of wettable surface area and drip formation points at the intersections of the arcuate members and struts. Those skilled in the art will appreciate that any number of arcuate members and struts may be utilized to provide a plate construction having a practically unlimited number of open cellular units. Moreover, though circular plates have been discussed in these examples, it is also possible to construct the plates with angular or polygonal configurations to produce packing bodies of varying shapes.

Figure 6:
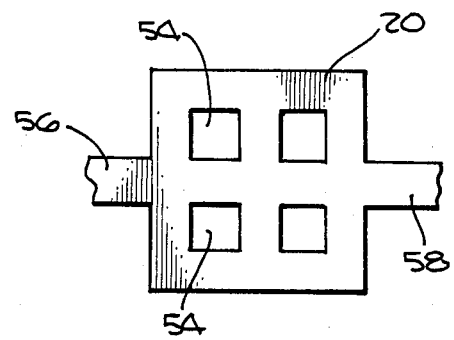
FIG. 6 is a plan view of a partial section of a blank illustrating an additional alternative plate configuration.

Along these lines, FIG. 6 illustrates an additional alternative embodiment of the present invention wherein plate 20 is formed as a rectangular polygon provided with a plurality of holes 54 relatively evenly distributed throughout its planar extent. Ribbon members 56 and 58 are shown extending from plate 20 in partial section to define the median strip linking adjacent plates (not shown) in linear series.

Figure 7:
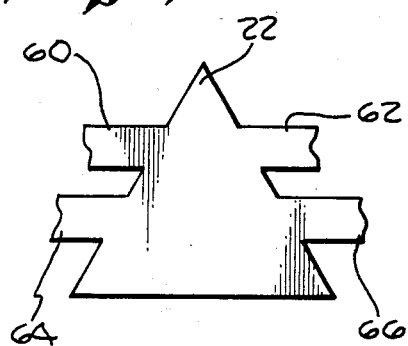
FIG. 7 is a plan view of a partial section of a blank illustrating an additional alternative plate configuration.

Similarly, FIG. 7 shows an additional alternative embodiment of blank 10 wherein plate 22 is constructed in a triangular polygonal configuration. Also shown in FIG. 7 is a further modification of the blank of the present invention wherein multiple ribbon members 60, 62, 64, and 66 are shown extending from plate 22 in partial section. Ribbon members 60 through 66 define the theoretical median strip linking the interconnected plates (not shown) in linear series of this alternative embodiment. The resultant packing body formed by a manufacturing blank comprising a plurality of identical plates 22 will be generally conical in its outer configuration. The provision of additional ribbon members 64 and 66 functions to provide additional wettable surface area and drip formation points as well as an external stabilizing meridian strip about the outer periphery of the packing body so formed.

Those skilled in the art will appreciate that the ribbon members utilized to practice the method of the present invention can be provided with holes, projecting fingers or arches (not shown), or slots of their own (not shown) to increase surface area. Moreover, as shown in FIG. 7, multiple ribbon members coupling adjacent plates in the linear series of the manufacturing blank can also be provided to further enhance the performance of the packing body.

Figure 8:
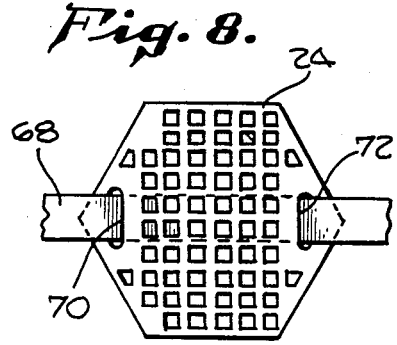
FIG. 8 is a plan view of a partial section of an alternative, multi-piece blank illustrating an additional alternative plate configuration and blank construction.

Turning now to FIG. 8, an additional alternative embodiment of the present invention is illustrated in which the manufacturing blank is constructed in a non-integral fashion from individual plates threaded on a continuous ribbon member. Thus, representative plate 24 is shown threaded on ribbon member 68 through slots 70 and 72. Plate 24 is shown as a polygonal plate of open wire mesh. The mesh of plate 24 can be constructed of metal, fiberglass, plastic, or other suitable material and provides a high degree of wettable surface area and drip formation points. Moreover, this non-unitary construction eliminates waste material produced from conventional stamping and cutting techniques by enabling the blank to be constructed from easily manufactured substantially identical plates which can be constructed from appropriately sized raw materials with minimal waste. Similar economies are achieved by utilizing a mass produced ribbon 68 which can be cut to the appropriate length and threaded through the appropriate number of plates to form a blank having the desired configuration and ultimate density.

Figure 9:
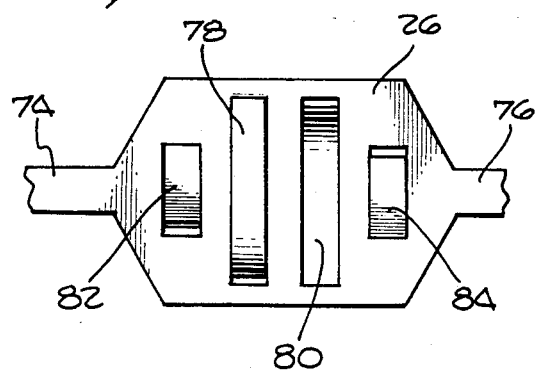
FIG. 9 is a plan view of a partial section of a manufacturing blank illustrating an additional alternative plate configuration provided with projecting fingers and arcuate members.
Figure 10:
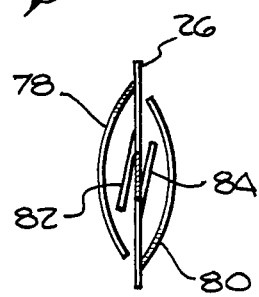
FIG. 10 is a side view of the alternative embodiment of FIG. 9.

To increase the efficiency of the packing body produced in accordance with the method of the present invention, it is also contemplated to provide the manufacturing blank with a plurality of projecting fingers or projecting arcuate strips to increase the number of drip formation points. FIGS. 9 and 10 show an alternative plate 26 having extending ribbon members 74 and 76 defining the theoretical median strip and punched out arcuate strips 78 and 80 and projecting fingers 82 and 84. Those skilled in the art will appreciate that projecting arcs 78 and 80 and projecting fingers 82 and 84 can be stamped or punched out of sheet material during the initial forming step of the present invention. Preferably, embodiments of the present invention having plates incorporating projecting arcs and fingers will be formed from sheet material with the projecting arcs and fingers prior to shaping of the plates into troughs. However, this is not essential to practice the method of the present invention as it is also possible to form a blank having the appropriate trough shaped configuration with projecting arcs and fingers. It should be appreciated that all of these alternative embodiments discussed can also be provided with a variety of holes having various configurations and locations as desired.

Those skilled in the art will appreciate that the folded configuration of the packing bodies formed in accordance with the teachings of the present invention impart a degree of structural rigidity that is sufficient to withstand the rigors of loading and operation in packed columns or towers. Additional strength can be provided through additional folds or ribbon members as well as selecting starting materials having the appropriate strengths or thickness to provide the desired degree of rigidity. Typically, a metal blank having an approximate thickness of 0.5 mm. is suitable for most metal packing applications. This material is quite rigid yet is easily manipulated with conventional sheet metal forming techniques to perform the method of the present invention.

A certain degree of interlocking and meshing of the packing bodies is to be expected when loaded into a packed column or tower. However, because of the complete absence of cupped or occluded surfaces within the packing bodies themselves and as a result of the substantially symmetrical configuration of the internal structures of the packing bodies, such interlocking will not have a significant effect on column performance. Additionally, interlocking can be reduced through the provision of additional ribbon members interconnecting the adjacent plates in the manufacturing blank. As shown in FIG. 4, ribbon members 30, 32, and 34 define a generally equatorial median strip preventing interlocking between plates 12, 14, and 16. Additional median strips as shown in FIG. 7 provide an enhanced degree of interlocking resistance and also provide additional structural rigidity.

The cross sectional shape of the angular troughs illustrated in FIG. 2 will vary from acute to obtuse angles depending upon the number of plates in the blank and the ultimate density of the packing body configurtion produced. Packing bodies having a minimal number of plates will utilize obtuse angles in the plates; whereas packing bodies comprising a relatively large number of interconnected plates will utilize acute angle troughs. The same is true for troughs having an arcuate configuration.

Having thus described exemplary embodiments of the method and manufacturing blank of the present invention, it should now be apparent to those skilled in the art that various modifications, adaptations, and equivalent constructions and steps may be made in view thereof which still fall within the scope and spirit of the present invention. For example, different forming techniques may be utilized to produce the manufacturing blank and a wide variety of projections may be substituted for the projecting arcs and fingers disclosed. Accordingly, the scope of the present invention is defined and limited only by the following claims.

What is claimed is:

1. A method for the manufacture of a high efficiency, high performance, substantially symmetrical, open volumed packing body for use in packed columns and towers, said method comprising the steps of:
   forming a blank of sheet material, said blank comprising a plurality of plates, said plates being interconnected in linear series by at least one ribbon member coupling adjacent plates and defining a median strip linking said linear series of said plates;
   shaping each of said plates into a trough having its longitudinal axis oriented generally perpendicularly to said median strip; and
   bending said median strip to bring said longitudinal axes of each of said shaped plates into close proximity with one another in substantially parallel alignment, thereby forming an open packing body having a central core defined by said aligned axes.

2. The method of claim 1 wherein said blank is formed as an integral member.

3. The method of claim 1 wherein each of said plates is formed with a plurality of generally uniformly distributed open cellular units.

4. The method of claim 1 wherein each of said plates is formed with a plurality of concentric arcuate members interconnected by a plurality of radially extending struts defining a plurality of generally uniformly distributed open cellular units.

5. The method of claim 1 wherein each of said plates is formed as a generally regular polygon.

6. The method of claim 1 wherein each of said plates is shaped into an arcuate trough.

7. The method of claim 1 wherein each of said plates is shaped into an angular trough.

8. The method of claim 7 wherein said angular troughs are acute.

9. The method of claim 7 wherein said angular troughs are obtuse.

10. The method of claim 1 wherein said sheet material is metal plate.

11. The method of claim 1 wherein said sheet material is plastic.

12. The method of claim 1 wherein said sheet material is open mesh.

13. The method of claim 1 wherein each of said plates is formed with a plurality of projecting fingers.

14. The method of claim 1 wherein each of said plates is formed with a plurality of projecting arcuate strips.

15. A method for the manufacture of a high efficiency, high performance, substantially symmetrical, open cell packing body for use in packed columns and towers, said method comprising the steps of:

forming a blank from sheet material, said blank comprising a plurality of plates integrally interconnected in a linear series by at least one ribbon member coupling adjacent plates and defining a median strip linking said linear series of said plates, each of said plates being provided with a plurality of generally uniformly distributed open cellular units;

shaping each of said plates into a trough having its longitudinal axis oriented generally perpendicularly to said median strip; and bending said median strip to bring said longitudinal axes of each of said trough shaped plates into close proximity with one another in substantially parallel alignment to form an open packing body having a central core defined by said aligned axes.

16. The method of claim 15 wherein each of said plates is formed with a plurality of concentric arcuate members interconnected by a plurality of radially extending struts defining said plurality of open cellular units.

17. A method for the manufacture of a high efficiency, high performance, substantially symmetrical, open volumed uniform packing body for use in packed columns and tower, said method comprising the steps of: forming a blank from sheet material, said blank comprising a plurality of trough shaped plates, each of said plates having a longitudinal axis, said plates being interconnected in linear series by at least one ribbon member coupling adjacent plates and defining a median strip oriented generally perpendicularly to each of said longitudinal axes of each of said plates; and bending said ribbon member to bring said longitudinal axes of each of said trough shaped plates into close proximity with one another in substantially parallel alignment, thereby forming an open packing body having a central core defined by said aligned axes.

* * * * *